A. D. JUDD.
Chandelier-Hook
No. 217,009.          Patented July 1, 1879.
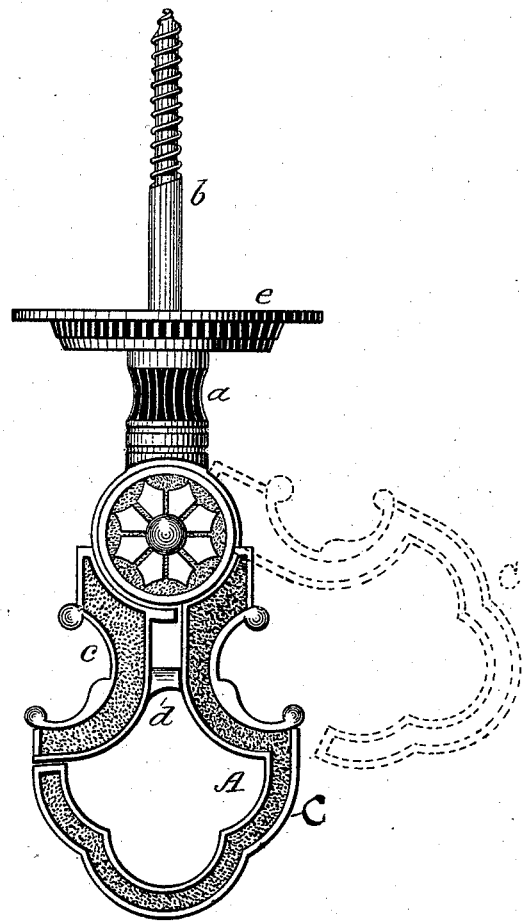
Witnesses
Nat. E. Oliphant
Geo. R. Porter
Inventor
Albert D. Judd,
per Chas. H. Fowler
Attorney.

UNITED STATES PATENT OFFICE.

ALBERT D. JUDD, OF WALLINGFORD, CONNECTICUT.

IMPROVEMENT IN CHANDELIER-HOOKS.

Specification forming part of Letters Patent No. 217,009, dated July 1, 1879; application filed May 5, 1879.

*To all whom it may concern:*

Be it known that I, ALBERT D. JUDD, of Wallingford, in the county of New Haven and State of Connecticut, have invented a new and valuable Improvement in Chandelier-Hooks; and I do hereby declare that the following is a full, clear, and exact description of the construction and operation of the same, reference being had to the annexed drawing, making a part of this specification, and to the letters and figures of reference marked thereon.

The drawing is a representation of a side elevation of my invention.

This invention has relation to hooks adapted to be secured to the wall of a room from which to suspend a chandelier; and the object thereof is to construct a hook of the above character from which a chandelier may be safely suspended and prevented from jumping out of the hook when pushed up suddenly, the construction and arrangement of the parts being hereinafter described, and pointed out in the claim.

In the accompanying drawing, A represents the hook, of any suitable metal, design, or ornamentation, pivoted to the shank $a$. This shank terminates in a screw, $b$, for attaching it to the wall of a room. Other means, however, may be employed, so long as the hook is securely fastened to the wall, in order to properly support the chandelier. The lower portion of the shank $a$ terminates in an extension, $c$, in form to correspond with the portion of the hook A, lying opposite, so that when the hook is down against the stop $d$ the rigid extension $c$, together with the part A, will form a closed hook, as illustrated in the drawing.

A rosette, $e$, suitably ornamented to correspond with the ornamentation of the hook A, may be placed over the screw $b$, to give the whole a neat appearance when the hook is secured to the wall.

A hook constructed according to my invention will admit of the chandelier being hung thereon in a vertical position without tipping; and as the hook A is pivoted, it by its own weight assumes a vertical position to close with the extension $c$; also, when the chandelier is suspended upon the hook, its weight will bring the hook into its place. It will therefore be seen that a closed hook is obtained, removing all danger of the chandelier jumping the hook when suddenly pushed up.

Having now fully described my invention, what I claim as new, and desire to secure by Letters Patent, is—

The shank $a$, provided with suitable means for securely fastening it to the wall of a room, and having the rigid extension $c$, in combination with the hook C, pivoted to the shank $a$, substantially as and for the purpose set forth.

In testimony that I claim the above I have hereunto subscribed my name in the presence of two witnesses.

ALBERT D. JUDD.

Witnesses:
LEVERETT M. HUBBARD,
E. M. JUDD.